United States Patent
Cavallo et al.

(10) Patent No.: US 9,500,363 B2
(45) Date of Patent: Nov. 22, 2016

(54) METHOD AND APPARATUS FOR EXTRACTION AND RECOVERY OF WATER-SOLUBLE VOLATILE GAS, WATER VAPOR AND WASTE HEAT FROM STACK GAS

(71) Applicant: Selas Heat Technology Company LLC, Streetsboro, OH (US)

(72) Inventors: John F. Cavallo, Wassaic, NY (US); James Pezzuto, Hasting-on-the-Hudson, NY (US); Helen Skop, Skokie, IL (US); Valeriy G. Oleynikov-White, Mesa, AZ (US)

(73) Assignee: Selas Heat Technology Company LLC, Montgomery, PA (US)

( * ) Notice: Subject to any disclaimer, the term of this patent is extended or adjusted under 35 U.S.C. 154(b) by 0 days.

(21) Appl. No.: 14/713,305

(22) Filed: May 15, 2015

(65) Prior Publication Data

US 2015/0276219 A1    Oct. 1, 2015

Related U.S. Application Data

(63) Continuation of application No. 13/086,745, filed on Apr. 14, 2011, now Pat. No. 9,062,880.

(60) Provisional application No. 61/323,902, filed on Apr. 14, 2010.

(51) Int. Cl.
| | |
|---|---|
| *F23J 15/06* | (2006.01) |
| *B01D 53/00* | (2006.01) |
| *F23J 15/02* | (2006.01) |
| *F28D 5/02* | (2006.01) |
| *F28D 21/00* | (2006.01) |

(52) U.S. Cl.
CPC .............. *F23J 15/06* (2013.01); *B01D 53/002* (2013.01); *F23J 15/02* (2013.01); *F28D 5/02* (2013.01); *F28D 21/0003* (2013.01); *B01D 2257/7022* (2013.01); *B01D 2258/0275* (2013.01); *F23J 2219/40* (2013.01); *F23J 2219/70* (2013.01); *F23J 2900/13004* (2013.01); *Y02E 20/363* (2013.01)

(58) Field of Classification Search
None
See application file for complete search history.

(56) References Cited

U.S. PATENT DOCUMENTS

| | | | | |
|---|---|---|---|---|
| 4,834,841 | A * | 5/1989 | Peck ..................... | B01D 3/146 126/300 |
| 5,165,889 | A * | 11/1992 | Baggott ................ | F24C 15/322 126/21 A |
| 5,846,299 | A * | 12/1998 | Pravda ................... | B01D 1/14 95/187 |

FOREIGN PATENT DOCUMENTS

CN        102155854 B  *  9/2012

* cited by examiner

*Primary Examiner* — Duane Smith
*Assistant Examiner* — Cabrena Holecek
(74) *Attorney, Agent, or Firm* — Bond, Schoeneck & King, PLLC

(57) ABSTRACT

An apparatus and method for extracting and recovering water-soluble gas and waste heat from an oven is provided. The method employs a gas-gas heat exchanger for cooling hot stack gas from the oven to a temperature higher than the dew point of the hot stack gas, a double-film-wise heat exchanger for receiving the cooled stack gas from the gas-gas heat exchanger, a condenser/heat exchanger for receiving and further cooling the stack gas from the double-film-wise heat exchanger to ambient temperature by heating a utility water stream, which can then be used for hot water and steam process services, and an ethanol recovery unit for receiving the cooled stack gas from the condenser/heat exchanger.

4 Claims, 4 Drawing Sheets

ERB CONCEPT TEST LAYOUT

METHOD AND APPARATUS FOR EXTRACTION AND RECOVERY OF WATER-SOLUBLE VOLATILE GAS, WATER VAPOR AND WASTE HEAT FROM STACK GAS

RELATED APPLICATIONS

This application is a continuation of U.S. application Ser. No. 13/086,745, filed Apr. 14, 2011, which claims the benefit of U.S. Provisional Application No. 61/323,902, filed on Apr. 14, 2010. The entire teachings of the above applications are incorporated herein by reference.

BACKGROUND OF THE INVENTION

1. Statement of the Technical Field

This invention generally relates to extraction and recovery of water-soluble volatile gas, water vapor and waste heat from stack gas, and more specifically, to such extraction and recovery from the stack gas generated by ovens, such as in the bakery industry.

2. Description of the Related Art

Currently, bakeries and many other industries face two significant economic problems with respect to the use of ovens: (1) low oven efficiency resulting from the loss of waste heat in stack gas and (2) correcting the negative environmental impact of pollutant emissions venting with the stack gas into the atmosphere.

Often, bakeries and other businesses that use ovens are forced to install expensive oxidizing equipment to burn the ethanol and other dangerous pollutant emissions in the stack gas, in order to comply with Environmental Protection Agency ("EPA") or other governmental regulations. The oxidizers consume additional fuel unrelated to the baking process and generate increased heat losses at the oven site.

The EPA currently requires use of oxidizers as the only technically feasible and suitable control technology for bakery ethanol emissions. Bakeries required to use expensive oxidizing equipment consume additional fuel in order to meet EPA requirements to reduce emissions. In general, the EPA discourages the use of other control devices like carbon adsorption, scrubbers, biofiltration, or condensation. For example, according to the EPA, carbon adsorption units are not recommended on bakery ovens because fats and oils may clog the carbon pores, and ethanol is difficult to strip from the carbon. Also, biofiltration is inefficient because it requires cooling of cool stack gas to an appropriate temperature. In addition, scrubbers are not recommended because of water pollution produced by the scrubber. Finally, the EPA takes the position that condensers are not technically feasible because airflow rates are too high and condensate disposal costs are also too high. See, Alternative Control Technology Document for Bakery Oven Emissions, EPA-453/R-92-017, available online at epa.gov (hereinafter the "EPA Document"), at pages 3-1 to 3-11.

Despite the EPA's preference for oxidizers, condensers and condensation processes have been viewed as promising avenues for recovering ethanol, primarily because of ethanol's ready solubility in water. Some relatively recent patents have focused on condensation principles to remove ethanol from stack gas.

U.S. Pat. No. 5,846,299 to Pravda and U.S. Pat. No. 4,834,841 to Peck both suggest cooling stack gas so as to generate a condensate of water mixed with ethanol. The processes in those patents then increase ethanol concentration and collect the resulting liquid ethanol/water solution for later sale.

In general, the condensation processes involve cooling the stack gas below the dew point of the relevant vapor in the stack gas. Water vapor, at 20 percent by mass in the stack gas, has a dew point temperature of approximately 170° F. As the stack gas further cools to ambient temperature (approximately 70° F.), most of the water vapor in the stack gas will condense out. But ethanol has a lower dewpoint than water vapor and its concentration may be 50 times less. The properties of ethanol are such that it will start to condense at lower temperatures, especially at lower concentrations.

Henry's Law provides that the weight of a gas dissolved by a liquid is proportional to the pressure of the gas upon the liquid. Calculations under Henry's Law show, for example, that ethanol condensation occurs at 28.3° F. for a 1.15 percent concentration and at 2.8° F. for a 0.35 percent concentration. While condensing water vapor could absorb some ethanol as temperature decreases, self condensation of ethanol will not occur in practice above ambient temperature. As an example, under Henry's Law, with the stack gas at 120° F., the amount of water needed to absorb ethanol would be 6 times the amount needed at ambient temperature of 68° F., as shown in FIG. 3.

Peck suggests using the condensation process during cooling of the stack gas, employing a packed column, which increases the surface of the ethanol-absorbing condensate. Using packed beds, Peck increases surface area for ethanol diffusion. However, at the average condensate temperature of 120° F., ethanol's ability to diffuse in water is so low that the amount of condensate would be six times less than would be necessary to completely remove all the ethanol. This assumes that dropwise condensation can even be achieved in an industrial application such as a commercial bakery.

Pravda describes a way to recover ethanol for subsequent sale to end users, suggesting humidifying hot stack gas by adding additional moisture. After addition of the moisture, the stack gas cools, condensing the stack water vapor together with the added water vapor and ethanol. In sum, Pravda's method consumes substantial amounts of clean water in addition to the normal needs of the bakery, thus resulting in significant amounts of hot, dirty condensate, which must then be treated before it is returned to the environment. Moreover, half the condensate would have a temperature above 120° F., leaving it incapable of absorbing any significant amount of ethanol. The recovery of such a small amount of ethanol by using expensive equipment would not seem economically feasible.

In addition to Peck and Pravda, the following references include information of interest, although somewhat less relevant: U.S. Pat. Nos. 635,854; 6,071,116; 5,547,373; 5,544,570; 5,417,198; 5,228,385; 4,492,216; 4,483,243; 4,438,685; and, 3,922,136; U.S. Patent Application Publication Ser. Nos. 2008/0041032 and 2008/0008974; and, foreign patents nos. DE 29602748; DE 3631348; and DE 3314386.

SUMMARY OF THE INVENTION

An aspect of the present invention provides an apparatus and method for extracting and recovering water-soluble gas and waste heat from an oven. The apparatus and method includes a gas-gas heat exchanger for cooling hot stack gas from the oven to a temperature higher than the dew point of the hot stack gas, and for transferring the removed heat to pre-heat combustion air containing ethanol vapor which has been recovered from the waste stack gas. It also includes a double-film-wise heat exchanger for receiving the cooled stack gas from the gas-gas heat exchanger, the double-film-wise heat exchanger comprising cooling and heating channels running in counter-flow directions, in which a thin film of liquid is formed or induced on each side of a common heat transfer wall of each channel in order to enhance the coefficient of heat transfer and increase transfer efficiency. Additionally included is a condenser/heat exchanger for receiving and further cooling the stack gas from the double-film-wise heat exchanger to ambient temperature by heating a utility water stream, which can then be used for hot water and steam process services, and, an ethanol recovery unit for receiving the cooled stack gas from the condenser/heat exchanger, the ethanol recovery unit comprising a special fog generator for spraying water in several water droplet clouds at an angle to a horizontal plane, wherein the clouds of water droplets descend through the ethanol recovery unit and fall to the bottom, and the cooled stack gas enters the ethanol recovery unit and is released into the droplet cloud tangentially from a plurality of points near the bottom of the ethanol recovery unit, the water and cooled stack gas condensate mixing and exiting from the bottom of the ethanol recovery unit. Preferably, the water droplets are sprayed at a slow rate in order to provide maximum time for contact with the cooled stack gas' ethanol component.

In another aspect of the invention, the apparatus and method also includes a water treatment unit for receiving the water and cooled stack gas condensate from the ethanol recovery unit, the water treatment unit comprising filters for separating water from ethanol, oil, or solid particles and heat exchangers for transferring heat from the condensate to utility water and recovering the ethanol, oil or solid particles from the condensate.

In another aspect of the invention, the method includes passing hot stack gas through one side of a gas-to-gas heat exchanger, thereby transferring heat to an air-ethanol mixture passing on the other side of the gas-to-gas heat exchanger, passing the stack gas emerging from the gas-to-gas heat exchanger through a double-film-wise heat exchanger, thereby forming a film of hot primary condensate and cooled stack gas, treating the hot primary condensate exiting the double-film-wise heat exchanger by filtration and purification in a water treatment unit, resulting in a filtered condensate of water for reuse, cooling the cooled stack gas further using a condenser/heat exchanger, thereby extracting additional heat, ethanol and water.

In a further aspect of the invention, the water from the condenser/heat exchanger is filtered and treated to produce additional water for reuse.

BRIEF DESCRIPTION OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

Figure 1:
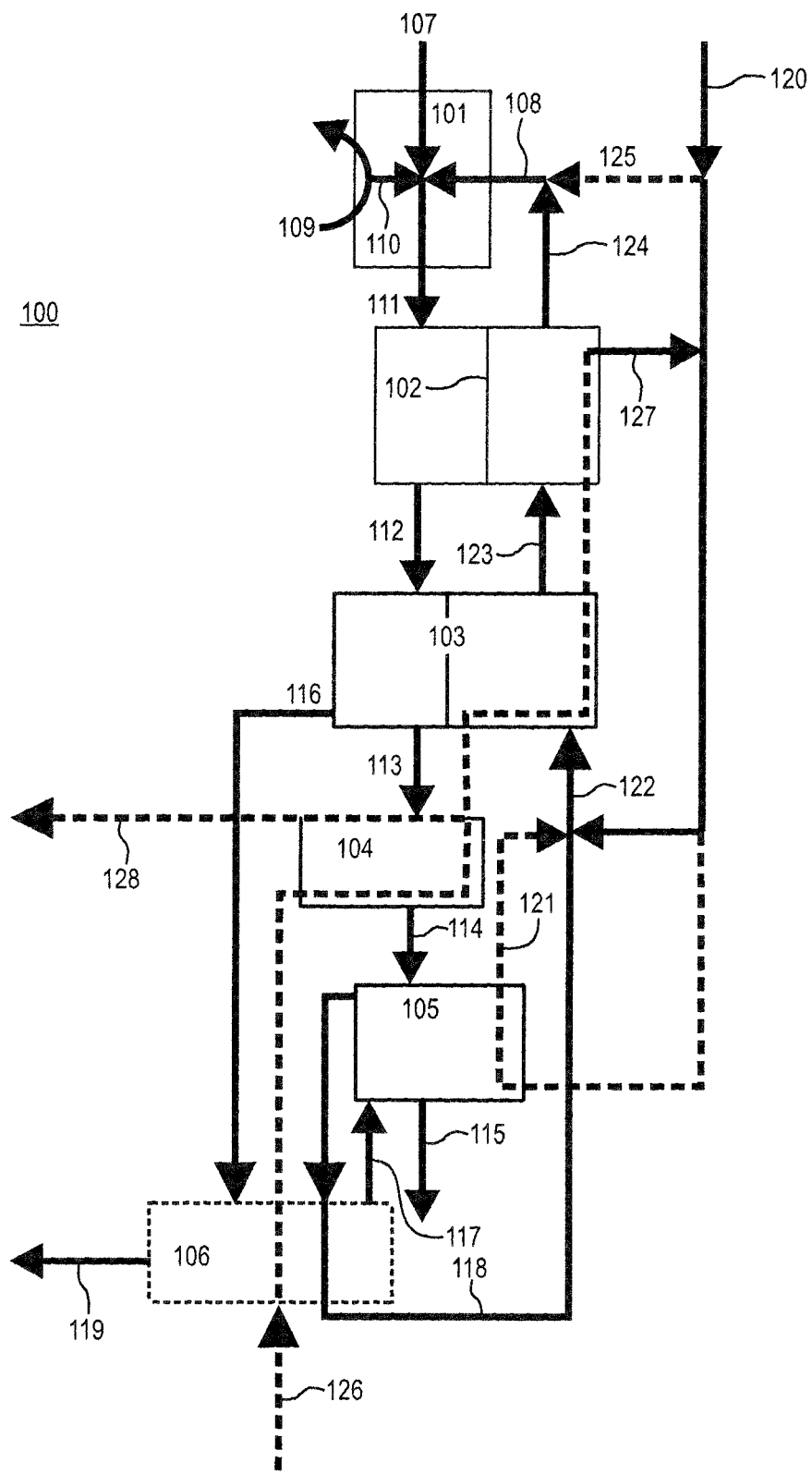
FIG. 1 is a schematic diagram of a system for stack gas ethanol, water vapor and waste heat extraction and recovery, in accordance with an embodiment of the invention.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The present invention advantageously provides for optimizing the recovery of stack waste heat, water vapor, and volatile ethanol or other water-soluble gas by incorporating the recovery processes into one system.

The present invention also advantageously provides integration and thermodynamic balance to the recovery processes with the main emitting process, e.g., baking, drying, or other, and the auxiliary process services, resulting in savings of energy and water and reduction of pollution.

The present invention also advantageously discloses a method of extracting ethanol or any other water-soluble volatile gas by creating optimal conditions for its diffusion into water droplets. The method employs a system of heat exchangers, water filters, and a gas-capture unit for extracting heat, water, and ethanol (or other water-soluble gases such as ammonia) from the oven effluent. The system recovers these elements in an optimal form to transport them back to be consumed in the process. Recovery of this stack heat, water, and ethanol can reduce bakery fuel consumption by up to 50 percent. Water vapor recovered by the system from the stack gas may be used in the form of hot water and steam for bakery services. The process could potentially supply up to 25 percent of bakery water needs and could also reduce or even eliminate the need for existing boiler service, thereby reducing primary fuel consumption and carbon emissions. Efficient ethanol extraction by the system eliminates the need for oxidizer services, and provides a supplemental fuel to be burned in the oven, further reducing primary fuel gas consumption and carbon emissions.

The inventive apparatus and process is not limited to use with bakery ovens. The principles set forth would apply to any combustion unit burning a fuel gas where the heating process generates water-soluble volatile gas.

References herein to "ethanol" are not intended to be limiting, and are generally applicable to other volatile water-soluble gases as well, to be considered in the particular context employed.

This present invention is presented herein in its various embodiments. One particular embodiment is known as the CORE-ERB™ process or system. "CORE-ERB" is an acronym for Condenser-Oxidizer Recuperative Exchanger with Ethanol Recovery Block.

As referred to above, currently, bakeries and many other industries using ovens face two significant economic problems: low oven efficiency resulting from loss of waste heat in stack gas and negative environmental impact from pollutant emissions venting with the stack gas into the atmosphere.

It is estimated that the consumption of energy in a typical oven with a typical hot stack gas flow of 400° F. and higher carries about two-thirds of the energy of the fuel consumed in the oven to the atmosphere. Moreover, because of the fermentation of yeast in the bakery process substantial amounts of ethanol vapor are also released.

An embodiment of the present invention provides a process to remove ethanol or any other water-soluble volatile gas from stack gas. Removing ethanol from the waste stream could eliminate the need to use expensive oxidizing modules. The recovered ethanol could replace a substantial amount of the fuel consumed by the oven during normal operation. For example, the primary volatile organic compound ("VOC") emitted in a bakery operation is ethanol, which is produced by the action of yeast on dough. When the dough is heated in the oven, the alcohol evaporates into the oven at the rate of 0.6 to 14 lb per ton of bread. See, EPA Document at page 1-3. As ethanol has a heat value of 12,800 BTU/lb, the potential heat from ethanol released in the baking process translates to 7 to 180 BTU per lb of bread. Bread production typically requires 520 BTU/lb. See, EPA Document at page 4-5. Therefore, recovery of the ethanol and its use as a fuel in the oven could replace from 1.5% to 35% of the fuel otherwise needed.

In an embodiment of the invention, a process to recover water vapor and waste heat from the stack gas is provided.

The present invention provides a method for extracting ethanol emissions by creating optimal conditions for ethanol to diffuse into water droplets. The phenomenon of gas-water diffusion and conditions for its optimization are exemplified in the very similar process of gas diffusion from the atmosphere into falling rain droplets.

Molecule absorption by water droplet surfaces is a consequence of Henry's Law. Compared to the ethanol condensation process, which occurs below 2° F. for typical ethanol concentrations found in a bakery oven stack, ethanol diffusion can occur at higher temperatures of up to ~100° F.

Figure 3:
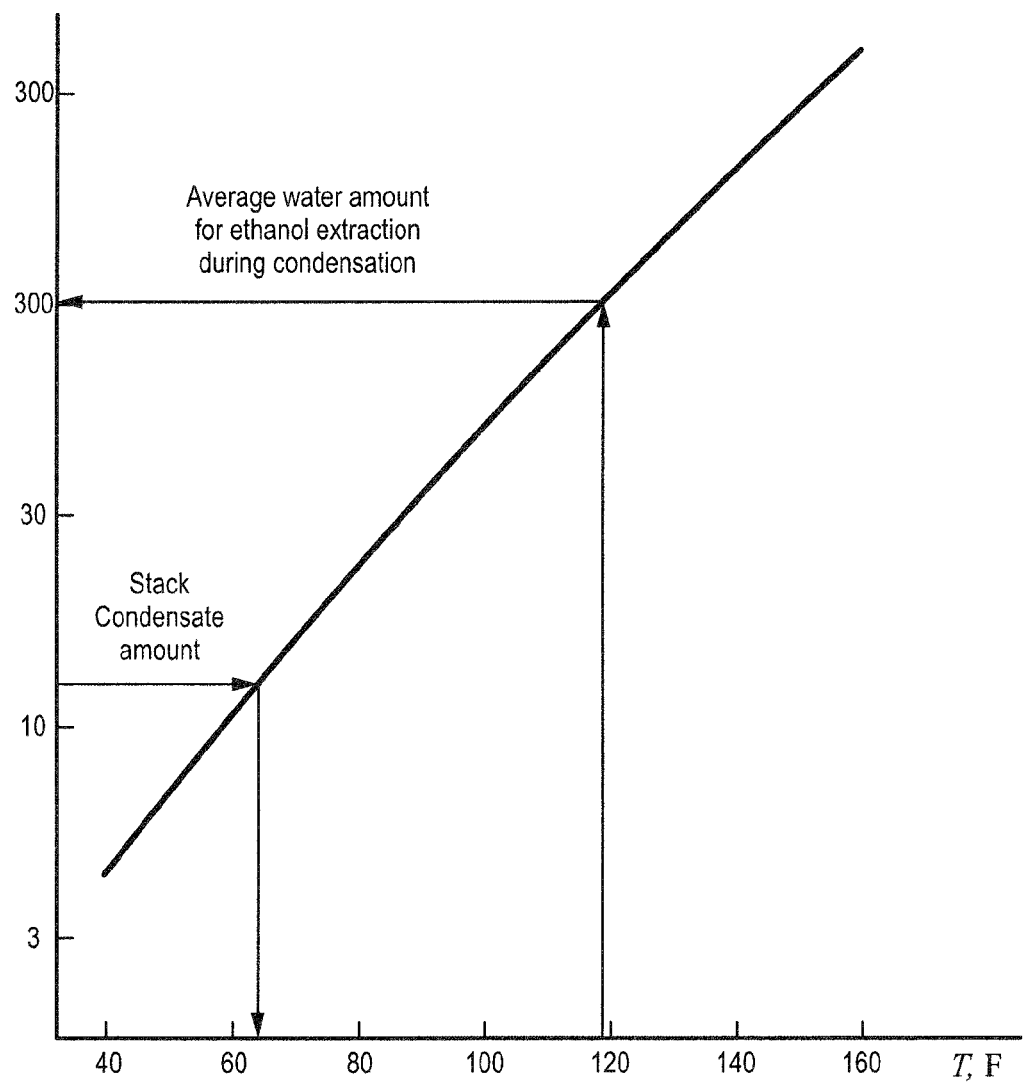
FIG. 3 is a graphical depiction of the dependence of the Henry's Law for removing ethanol from a stack gas; and, FIG. 4 is a graphical depiction of the dependence of Henry's Law constant on temperature.
Figure 4:
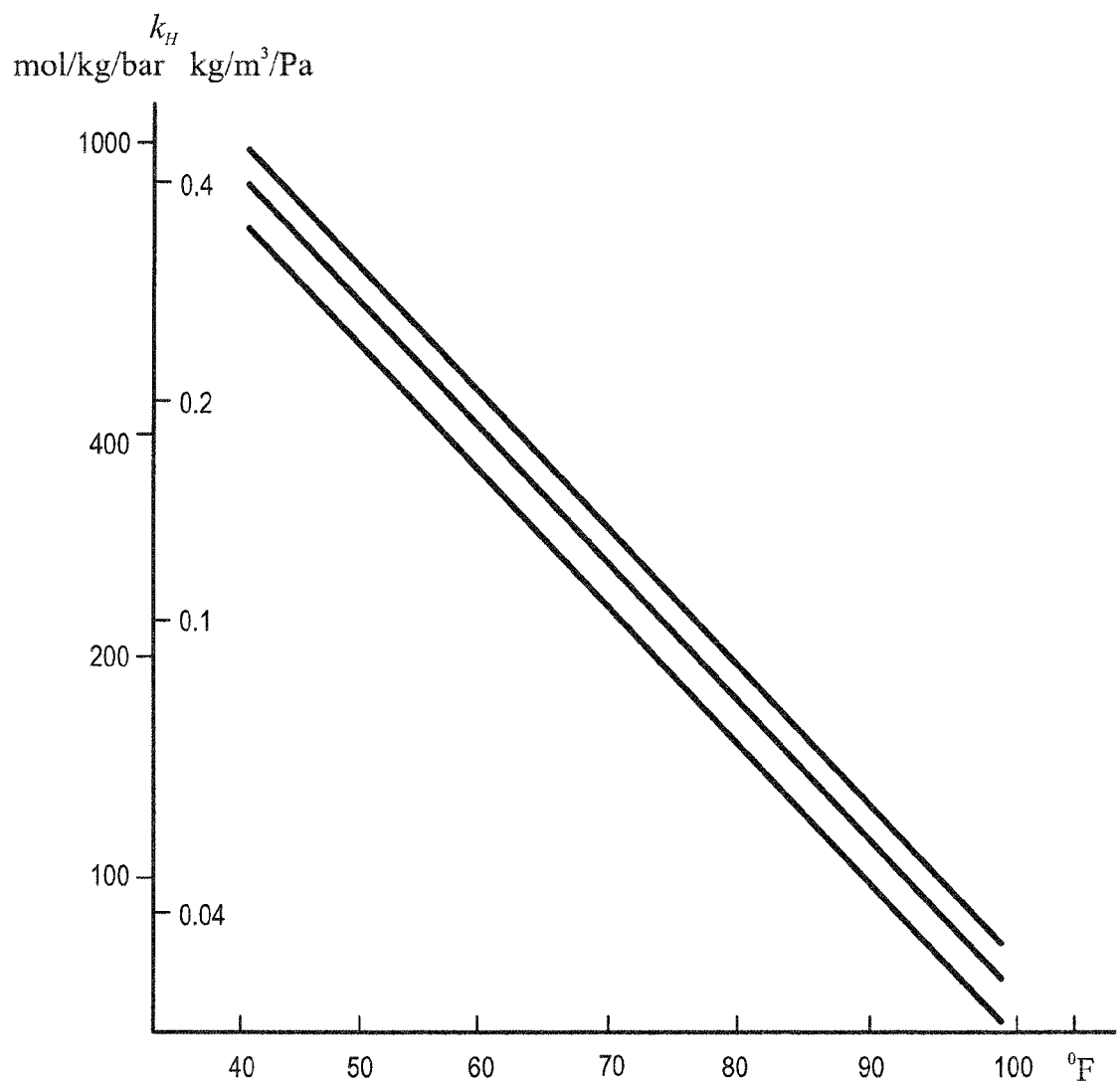

Referring to FIG. 4, which shows the dependence of the Henry's Law constant on temperature, the solid middle line represents the approximate average of the constant. The upper and lower thin lines are one standard deviation from the average constant value. Some ethanol diffusion occurs during cooling of stack gas below its dew point temperature of approximately 167° F., when water vapor condenses, as some amount of ethanol diffuses into the surface of the water condensate droplets or film. Water vapor condensation mostly occurs in a temperature range between ~170° F. and ~68° F., the average temperature being about 120° F. Calculations under Henry's Law integrated over this temperature range show that the potential for ethanol diffusion is only about 10 percent because there is not enough mass of condensate in the stack gas to catch all the ethanol vapor. This is also represented in FIG. 3.

The only way to diffuse more ethanol at these temperatures is to introduce large amounts of water into the stack, probably from the city utility water service, in droplets of 30-50 micron diameter. The direct injection of water into the stack at an average temperature of 120° F., both to effect stack cooling and to capture all the ethanol, would generate a tremendous amount of hot dirty water, estimated to be two to three times a bakery plant's average consumption. Therefore, most of the water, and the heat recovered with it, would be thrown away. Additionally, to recover the ethanol, there would be the problem of trying to separate a small mass of ethanol from a large mass of water. This process would be expensive and would require massive machinery to handle the amounts of water necessary. Although the process might clean the stack of VOCs, the process would simply transfer the VOCs to a waste water stream. In fact an EPA report on the effectiveness of various methods of VOC reduction in bakery oven effluent streams concludes that: "Contact condensers cool vapors by spraying a relatively cold liquid into the gas stream . . . but typically produce large amounts of wastewater . . . and therefore, are not considered appropriate for bakeries." EPA Document at 3-8.

If the stack gas is first cooled to about 68° F., the mass of water needed to capture all the ethanol contained in the stack gas would be about 10 times less than if the ethanol diffusion took place during stack gas cooling and condensation at an average temperature of 120° F. In fact, at ~68° F. the mass of water needed would be no greater than what can be condensed from the water vapor in the stack gas. However, the gas must be cooled and the water vapor must be condensed out of the gas before the ethanol can be extracted. Thus, the two processes of ethanol extraction and stack gas heat extraction must be separated in order to create the optimal conditions for the most efficient realization of each process. The two processes are so interlinked and so determine the overall efficiency of the suggested system methodology, that some of the product of the stack gas cooling process—the condensate removed from the gas and then cooled below ambient temperature—must be used in the ethanol extraction process. This liquid mixture of extracted ethanol and condensed water is then used to cool the stack gas and condense the water vapor contained in the stack gas.

In the suggested methodology, some heat is extracted from the exhaust gas to bring the stack gas to temperatures just higher than where water vapor condensation will begin. This can be done, for example, in a thermosiphon type heat exchanger.

Most stack gas waste heat is carried by the latent heat of evaporation of the stack water vapor. In order to extract this latent heat and condense the water vapor the heat is absorbed by evaporating two different water streams, the total mass of which equals the mass of the condensed water vapor, into two separate air streams. One stream mixes air with the water-ethanol mixture that is obtained downstream in the system. This mixture is then heated and mixed with primary fuel gas to create an enhanced fuel mixture that is burned in the oven. The other stream evaporates city water and is used as steam in the proofer.

In an embodiment of the present invention, the Double Film-wise heat exchanger performs a highly efficient, enhanced heat transfer. Stack gas flows through the hot-side channel of the heat exchanger with condensate forming in a film on this hot side of the heat transfer surface. Air and a thin film of water/ethanol mixture flows in one chamber through the cool-side channel of the heat exchanger. A thin film of city water is applied to the second chamber on the same cool-side channel.

The two liquid films flowing counter to each other on each side of the heat-transfer wall create a high heat-transfer coefficient through the channel wall separating the hot-side channel from the cold-side channel. Flowing liquids generate thin liquid films and enhance the overall heat transfer through the wall, because of the small thickness of film, the low heat transfer resistance of films, and a significant temperature gradient. See, International Journal of Heat and Mass Transfer, Volume 26, Issue 5, May 1983, pp. 747-760, Drop-to-filmwise condensation transition: Heat transfer measurements for ethanediol, S. A. Stylianou and J. W. Rose, Department of Mechanical Engineering, Queen Mary College, University of London, London, U.K; received Jun. 1, 1982; revised Aug. 12, 1982. The temperature gradient results from the dew point temperature of the condensing water film being higher than the dew point temperature of the evaporating ethanol-water film.

Once the water vapor is condensed, it is drained and separated from the stack gas. Some of the resulting water can be filtered, heated, and directed to other plant processes and services. Some of it must continue to be cooled to about 68 EF before it is directed into the ERB-Ethanol Recovery Block. The water is broken up into droplets of 30-50 micron diameter in the upper region of the ERB-Ethanol Recovery Block. The water is then injected as fog into a stream that flows counter to that of the incoming ethanol-bearing, cool (68 EF) stack gas. In this way, it is possible to diffuse 100 percent of the stack ethanol into the water droplets. In an embodiment of the invention, only water which has already been condensed and removed from the stack gas is used.

Gravity causes the ethanol-bearing water droplets to fall to the bottom of the ERB-Ethanol Recovery Block where it is drained off and processed further. First the ethanol-water mixture is concentrated by separating out most of the water. The resulting pure water stream can be heated and used for complementary hot water service, e.g., as a transporting fluid. The concentrated ethanol-water stream is then heated and sent to the evaporation side of the double film-wise heat exchanger. There it is vaporized into the combustion air by absorption of the latent heat of evaporation of the condensing water vapor in the stack gas. Finally, the ethanol can be burned in the oven as a supplementary fuel.

In addition to the removal of ethanol and other VOCs for use as supplemental fuel in the oven, the proposed process will provide the plant with preheated combustion air, process steam, and hot water, thus allowing savings in fuel consumption.

Figure 2:
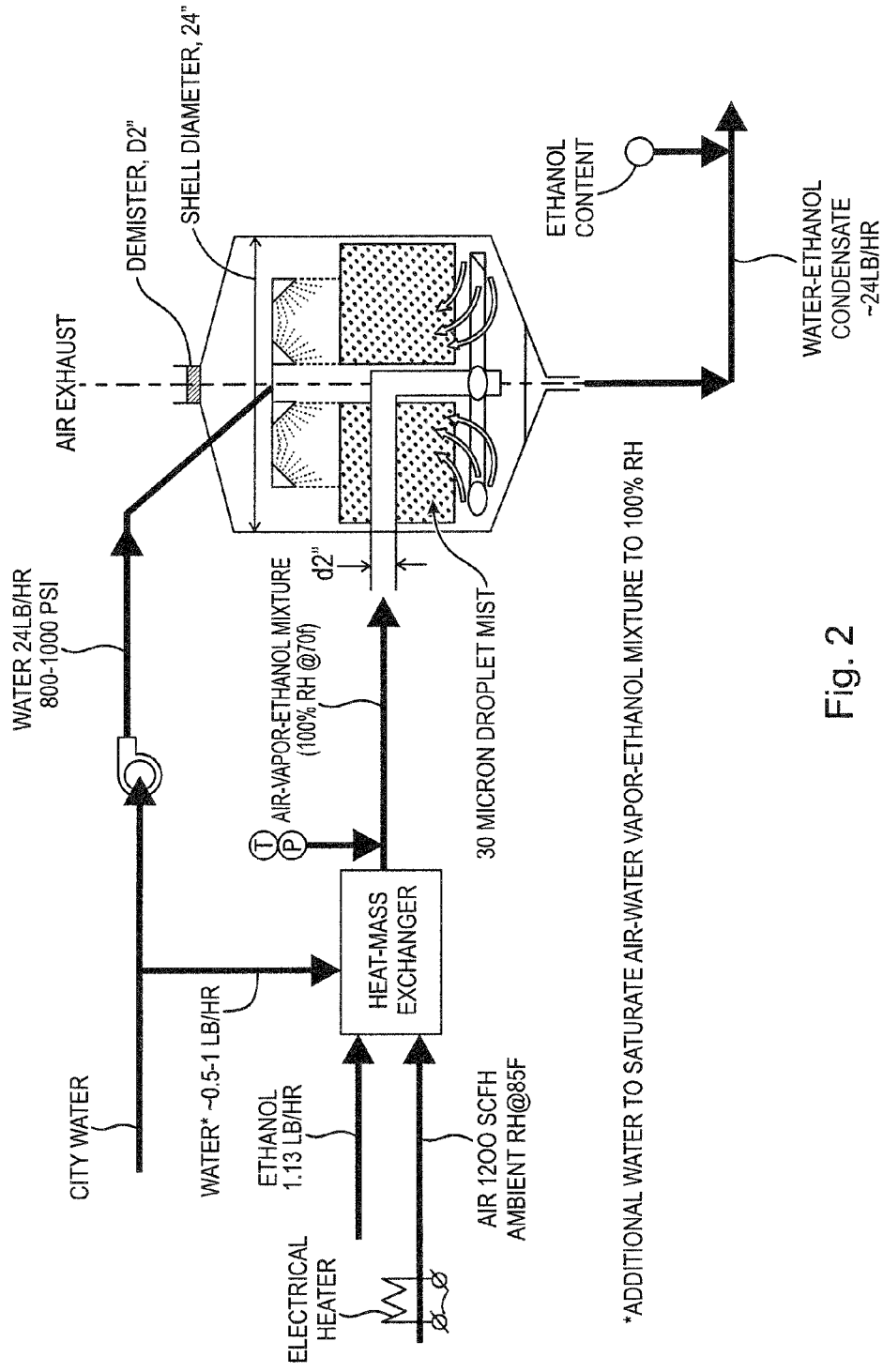
FIG. 2 is a schematic diagram of an ethanol recovery block test layout, in accordance with an embodiment of the invention.

The ERB-Ethanol Recovery Block diffusion concept was proven in a test rig where ethanol-bearing saturated air at 100-percent relative humidity was captured by a water fog of 30-50 micron diameter particles generated from city water. FIG. 2 depicts the ERB-Ethanol Recovery Block concept test layout.

The invention's processes are undertaken by a system of heat exchangers, water filters, and a gas diffusion unit for extraction of heat, water, and ethanol or other gas from the stack gas. The system recovers these components in an optimal form for transport for consumption back in the process. Recovery of this water, stack heat, and ethanol could reduce bakery fuel consumption by up to 50 percent. Water vapor recovered by the system from the stack could be used for hot water and steam for bakery services, potentially supplying up to 25 percent of bakery water needs. The recovered hot water could also reduce or even eliminate the need for existing boiler service, thus reducing primary fuel gas consumption and carbon emissions. Efficient ethanol extraction by the system eliminates the need for oxidizers, and provides a supplemental fuel to be burned in the oven, further reducing primary fuel gas consumption and carbon emissions.

FIG. 1 schematically discloses an exemplary system for extraction and recovery of water-soluble volatile gas, water vapor and waste heat from stack gas. In an embodiment of the present invention, the main modules in the system are the gas-to-gas heat exchanger 102, such as a heat exchanger with thermosiphons, the double-film-wise heat exchanger 103, the condenser-heat exchanger 104, the ERB-ethanol recovery block 105, and the water treatment unit 106.

These various modules, related units, their interconnections and functioning are described in an embodiment as follows.

An oven 101 includes an enclosed area where waste stack gas is generated as a result of combustion and baking processes. The stack gas includes water vapor, as a product of primary combustion and as a result of the baking or drying process, and VOCs, such as mostly ethanol.

A multipurpose gas/gas heat exchanger 102 is provided for cooling hot stack gas from the oven, which is typically in the range of 480° F.-180° F. down to a temperature higher than its dew point of ~170° F. The heat removed by the cooling process is transferred to pre-heat combustion air containing ethanol vapor which has been recovered from the waste stack gas. In the diagram, the left channel is the stack gas stream being cooled and the right channel is the return process stream being heated. The pre-heated air is introduced into the combustion air stream by the methods claimed herein. Additional available heat can be used for steam generation.

Next, a double-film-wise heat exchanger 103 with cooling and heating channels running in counter-flow directions receives the cooled stack gas from the multipurpose gas/gas heat exchanger 102. In the double-film-wise heat exchanger 103, a thin film of liquid is formed or induced on each side of the common heat transfer wall of each channel in order to enhance the coefficient of heat transfer and increase transfer efficiency. Functionally, water is formed in a thin film on the heat transfer surface inside the cooling channel—a.k.a. filmwise condensation—as water vapor gives up its latent heat and condenses during stack gas cooling. Here, as the stack gas is cooled down from ~180° F.-~110° F., water vapor condensation occurs in the temperature range from ~167° F.-~110° F. In the heating channel, running in a counter-flow direction to the fluids in the cooling channel, a thin film of ethanol-water mixture adheres onto the heat transfer surface along with a mass flow of air. Evaporation of mixture film into the passing air occurs by the film absorbing the latent heat given off by the water vapor condensing on the other side of the heat exchange surface. This air, now saturated with water vapor and ethanol vapor, is sent further along in the system to be heated and mixed with primary fuel gas for burning in the oven. The water that is condensed in this manner, ~75 percent of the total water mass of the stack gas, may be immediately drained from the running thin film and transferred through the system for filtration and further cooling, thereby also minimizing the evaporation of condensate back to the stack gas. Additional heat from the condensation process can be used to evaporate city utility water, for example, for providing steam process services.

Further downstream from the Double-Film-wise heat exchanger 103, a Condenser/heat exchanger 104 further cools the stack gas down to ambient temperature by heating a city utility water stream, which can then be used for hot water and steam process services. The water vapor condensing in this heat exchanger could contain about 2 to 3 percent of stack ethanol which diffuses into the water during condensation at temperatures below ~110° F. This condensate is drained and transferred to plant hot water service, for example, for washing production containers and utensils, after preheating. The cool stack gas, at a relative humidity of 100 percent and still containing process ethanol, flows on to the ERB-Ethanol Recovery Block 105.

The ERB-Ethanol Recovery Block or unit 105, is a unit where the cool, ethanol-laden stack gas is introduced into a cold fog of 30-50 micron diameter water droplets. According to Henry's Law, ethanol diffuses into the water droplets and is drained from the unit as an ethanol-water mixture. Water for the fog comes from the water condensed from the stack gas after being filtered, cooled, and processed. This water enters the top of the ERB-Ethanol Recovery Block at a central point and passes through a special fog generator which produces—typically 4 or more—"clouds" at an angle to the horizontal plane. Preferably, the clouds of water droplets are introduced at a temperature lower than gas, in order to maintain the ethanol at a high potential to diffuse into water when heat is released by diffusion during the extraction process. Also preferably, the water droplets are maintained at an optimal size of 30 to 35 microns, and at least in the range of 20-50 microns. The clouds of water droplets fly through the ERB-Ethanol Recovery Block and fall to the bottom. The ethanol-laden stack gas enters the ERB-Ethanol Recovery Block and is released into the fog tangentially from several—again, typically 4 or more—points near the bottom of the ERB-Ethanol Recovery Block. As the gas rises through the fog, ethanol diffuses into the surfaces of the falling fog droplets. The stack gas, thus stripped of virtually all ethanol, finally passes through a defogger, a device that uses the inertia of any small fog droplets to trap and drain them before they are carried out of the ERB-Ethanol Recovery Block with the exiting stack gas. The stack gas exits at ambient temperature and 100-percent relative humidity, but stripped of most water mass, most heat, and virtually all VOCs. The ethanol-water mixture is immediately drained from the bottom of the ERB-Ethanol Recovery Block and continues on through the system for further separation and preparation for combustion. Small amounts of ethanol-water mixture adhering to the ERB-Ethanol Recovery Block walls can be captured by passing a small ambient air stream over the walls of the ERB-Ethanol Recovery Block to absorb the mixture liquid, which can then be passed through the system for further treatment and preparation for combustion.

A water treatment unit 106 is also provided. In an embodiment of the invention, the water treatment unit 106 consists of filters to separate water from ethanol, oil, and solid particles, and heat exchangers to transfer heat from hot condensate to city utility water and recovered condensate. Also depicted in FIG. 1 are fuel gas 107, usually natural gas or propane, consumed by the oven combustion process to heat the product and evaporate liquid components, e.g., water and ethanol, in a baking or drying process. Additionally, combustion air 108 supplies oxygen to the fuel gas for burning in the oven combustion process.

FIG. 1 also depicts the dough-to-bread process 109, bakery process emissions 110 of water, ethanol and other VOC emissions from the baking process, as well as hot stack gas 111, containing a mixture of combustion products and baking process emissions. The burning of fuel in an oven releases heat for baking. The expended effluent from the baking process consists of hot gases and water vapor formed in the combustion reaction, as well as water vapor and ethanol evaporated in the baking process. This expended stack gas has a temperature of ~400° F.-~500° F., 20-percent water vapor (by mass), 0.35-1.15-percent ethanol vapor (by mass), and carries with it more than half of the potential energy of the burned fuel.

Other features of an embodiment of the present invention also depicted in FIG. 1 include stack gas above dew point temperature 112 which has been cooled to a temperature just above the dew point where condensation of the entrained water vapor is yet to occur (~180° F.), and from which an amount of sensible heat has been recovered.

Additionally shown are stack gas after most condensation has occurred 113 which has been cooled to ~110 EF, a temperature lower than the dew point and from which most of the water vapor has been condensed out and removed from the stack gas stream. A significant portion of the stack gas heat potential, which was held in the form of the latent heat of condensation of water vapor, has been recovered. At this point the stack gas still has 100 percent relative humidity, and consists of about 5 percent water vapor by mass; and cold stack gas with ethanol content 114, which has further been cooled to ambient temperature (~68 EF) from which some more water vapor has been condensed out and the last bits of sensible and latent heat have been recovered—however, almost all the ethanol vapor is still entrained—this gas has 100-percent relative humidity and water vapor is about 1.0-1.3 percent by mass;

Also shown are waste stack gas with no pollution content 115 at ambient temperature has 100-percent relative humidity and an insignificant content of ethanol (0 to 5 percent of the primary emissions amount); hot water condensate 116 extracted from stack gas (cooled to ~110° F.) in a highly efficient condensation process; cold purified water condensate 117 that has been filtered from ethanol, oil, solid particles, and cooled by city water below ambient temperature; cold ethanol-water mixture 118, which is a mixture of water from the fog in the ERB-Ethanol Recovery Block and ethanol liquid diffused into the fog droplet surfaces; hot water 119 prepared from condensate captured from the stack, separated from the ethanol, oil, baking dust, and heated to ~170° F.; ambient air 120 air taken from the atmosphere for the combustion process; ambient air, with some ethanol content 121, absorbed in the ERB-Ethanol Recovery Block—in an optional system flow in which a small stream of ambient air can capture some of the water-ethanol ethanol droplets (or film), running along the walls of the ERB-Ethanol Recovery Block; combustion air 122 before preheating and ethanol saturation, ambient air is to be preheated and saturated with recovered ethanol; preheated air-ethanol gas 123, an air-ethanol mixture preheated prior to introduction into the combustion process; hot air-ethanol gas 124, which is hot combustion air with ethanol content; cold air for combustion process (supplement or bypass) 125, generally comprising ambient air which can be taken for the combustion process in addition to or instead of air prepared in the system; city utility water 126 for bakery process, which is to be heated and consumed as hot water and steam in the plant's services; steam 127 for bakery processes, which is heated by stack waste heat and used for bakery needs, such as the proofer; and, hot city utility water 128 for bakery services that has been heated by stack waste heat.

In an exemplary system used in a bakery, the process flow proceeds as follows. In the oven 101, fuel gas 107 mixes with combustion air 108 resulting in a combustion process that produces primarily heat, carbon dioxide, and water vapor. These combustion products then mix with the bakery process emissions 110, including water evaporated from the baked product, ethanol, oils, bread/flour dust, and other trace compounds, to emerge from the oven 101 as hot stack gas 111.

The hot stack gas 111 passes through the gas-to-gas heat exchanger 102 and is cooled by transferring heat to the air-ethanol mixture 123 passing on the other side of the gas-to-gas heat exchanger 102. The emerging stack gas 112 leaves the gas-to-gas heat exchanger 102 at a temperature of approximately 200° F., which is slightly higher than their dew point. The stack gas 112 continues into the Double-Film-Wise heat exchanger 103 where it cools to water's dew point temperature of approximately 170° F. and continues to cool below the dew point temperature, resulting in the formation of a thin film of hot primary condensate 116 along the Double-Film-Wise heat exchanger's 103 thermal-exchange walls.

Hot primary condensate 116 is treated by filtration and purification in the water treatment unit 106, for example, with a molecular-sieve membrane. The hot primary condensate 116 is also cooled further by the water-ethanol solution 118, resulting in a filtered condensate of warm (approximately 85° F.) water. This water can, for example, be further heated or processed for use in other bakery plant services 120.

The cooled stack gas 113 emerges from the Double-Film-Wise heat exchanger 103 at a relatively low temperature of approximately 110° F. From here it continues on to the condenser/heat exchanger 104 where the gas is further cooled to ambient temperature of approximately 68° F.

From the condenser/heat exchanger 104 the cooled saturated stack gas 114, having a relative humidity of 100 percent and a temperature of approximately 68° F., enters the ERB-ethanol recovery block 105, where it interacts with a fog of water droplets. This fog is generated in the ERB-ethanol recovery block 105 from purified cold condensate 117. After the extraction of ethanol, cold ethanol-free stack gas 115 is exhausted to the atmosphere. The extracted ethanol, having mixed with the water droplets, collects as a water-ethanol solution 118 in the ERB-ethanol recovery block 105. The water-ethanol solution is then drained to the water treatment unit 106.

In the water treatment unit 106, clean water is separated from the ethanol-water solution 118, for example, using a molecular sieve membrane. Then it is heated and flows as hot water 120 for use in the rest of the plant. From the water treatment unit 106, the ethanol-water solution, which now is more highly concentrated with ethanol, is preheated and enters the cooler side of the Double-Film-Wise heat exchanger 103.

In the Double-Film-Wise heat exchanger 103 the concentrated ethanol-water mixture proceeds in a "film-wise" manner along the cooler side of the heat-exchange wall. The ethanol evaporates and saturates the air flowing with it 122. Optionally, air saturation by the ethanol-water solution could be performed in two other steps: First, by passing a small ambient air stream 121 over the walls of the ERB-Ethanol Recovery Block to absorb the mixture liquid, and, second, by further mixing this liquid with the main stream of air 122, which is saturated in the Double-Film-Wise heat exchanger 103 by evaporating the ethanol-water solution with heat taken from the warmer stack gas 112.

After evaporation of the ethanol-water solution 118 to the air 122, a warm (~180° F.) air-ethanol gas mixture 123 forms and is directed to the gas-to-gas heat exchanger 102. The resulting hot (~350° F.) air-ethanol gas mixture 124 flows to the combustion process in the oven 101.

City water 126 is heated by passing it through the water treatment unit 1066, condenser/heat exchanger 104, and the Double-Film-Wise heat exchanger 103. The hot water flow coming from the Double-Film-Wise heat exchanger 103 is split. Some hot water 125 is used for bakery hot water services. The rest passes through the gas-to-gas heat exchanger 102, where it is evaporated into steam 127 and used for proofer service.

Having thus described the invention of the present application in detail and by reference to illustrative embodiments thereof, it will be apparent that modifications and variations are possible without departing from the scope of the invention defined in the appended claims.

What is claimed is:

1. A method for extracting and recovering water-soluble gas and waste heat from an oven, the method comprising:
   passing hot stack gas through a first side of a gas-to-gas heat exchanger, thereby transferring heat to an air-ethanol mixture passing on a second side of the gas-to-gas heat exchanger;
   passing the stack gas emerging from the gas-to-gas heat exchanger through a double-film-wise heat exchanger, thereby forming a film of hot primary condensate and cooled stack gas;
   treating the hot primary condensate exiting the double-film-wise heat exchanger by filtration and purification in a water treatment unit, resulting in a filtered condensate of water for reuse; and
   cooling the cooled stack gas further using a condensing heat exchanger, thereby extracting additional heat, ethanol and water.

2. The method in according with claim 1, further comprising filtering and treating the water from the condensing heat exchanger to produce additional water for reuse.

3. The method according to claim 1, further comprising using the ethanol extracted as fuel for the oven.

4. The method according to claim 2, further comprising using the additional water in the double-film-wise heat exchanger and the condensing heat exchanger.

* * * * *